United States Patent
Ma et al.

(10) Patent No.: US 9,933,564 B2
(45) Date of Patent: Apr. 3, 2018

(54) BACK LIGHT MODULE AND DISPLAY DEVICE

(71) Applicant: BOE TECHNOLOGY GROUP CO., LTD., Beijing (CN)

(72) Inventors: Yongda Ma, Beijing (CN); Yuxin Zhang, Beijing (CN); Yong Qiao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/107,061

(22) PCT Filed: Feb. 19, 2016

(86) PCT No.: PCT/CN2016/074078
§ 371 (c)(1),
(2) Date: Jun. 21, 2016

(87) PCT Pub. No.: WO2017/041442
PCT Pub. Date: Mar. 16, 2017

(65) Prior Publication Data
US 2017/0205573 A1 Jul. 20, 2017

(30) Foreign Application Priority Data
Sep. 9, 2015 (CN) .................... 2015 2 0696310 U

(51) Int. Cl.
*F21V 7/04* (2006.01)
*F21V 8/00* (2006.01)

(52) U.S. Cl.
CPC ......... *G02B 6/0091* (2013.01); *G02B 6/0088* (2013.01)

(58) Field of Classification Search
CPC ... G02B 6/0088; G02B 6/0091; G02B 6/0093
See application file for complete search history.

(56) References Cited

U.S. PATENT DOCUMENTS

2010/0080019 A1* 4/2010 Iwasaki ............... G02B 6/0091
362/628
2014/0307464 A1* 10/2014 Horiuchi ............. G02B 6/0091
362/602
2017/0090113 A1* 3/2017 Yuki .................... G02B 6/0088

FOREIGN PATENT DOCUMENTS

CN 101737674 A 6/2010
CN 102519018 A 6/2012
(Continued)

OTHER PUBLICATIONS

Written Opinion of the International Searching Authority dated Mar. 28, 2016 corresponding to International application No. PCT/CN2016/074078.
(Continued)

*Primary Examiner* — Ali Alavi
(74) *Attorney, Agent, or Firm* — Nath, Goldberg & Meyer; Joshua B. Goldberg

(57) ABSTRACT

Disclosed are back light module and display device. The back light module comprises a light source, a back plate, a light guide plate and a positioning member. The back plate is formed with a frame for receiving the light guide plate; the light source is provided on an inside surface of a side panel of the back plate and oppositely to a light incident surface of the light guide plate. The positioning member is provided at both ends of the back plate on a side where the light source is formed and interposed between the light incident surface of light guide plate and the light source. The back light module herein ensures that the gap between the light incident surface of light guide plate and the light source has fixed value, thereby improving evenness of display images of display device.

16 Claims, 3 Drawing Sheets

(56) References Cited

FOREIGN PATENT DOCUMENTS

| | | |
|---|---|---|
| CN | 103090323 A | 5/2013 |
| CN | 104520633 A | 4/2015 |
| CN | 204903917 U | 12/2015 |
| JP | 2004184493 A | 7/2004 |

OTHER PUBLICATIONS

International Search Report dated Mar. 28, 2016 corresponding to International application No. PCT/CN2016/074078.

* cited by examiner

BACK LIGHT MODULE AND DISPLAY DEVICE

This is a National Phase Application filed under 35 U.S.C. 371 as a national stage of PCT/CN2016/074078, filed Feb. 19, 2016, an application claims the benefit of Chinese Patent Application No. 201520696310.1, filed Sep. 9, 2015, titled "BACK LIGHT MODULE AND DISPLAY DEVICE" in the Chinese Intellectual Property Offices, the disclosure of which is hereby incorporated by reference.

FIELD OF THE INVENTION

The disclosure relates to the field of liquid crystal display technologies, and in particular to a back light module and a display device having the same.

BACKGROUND OF THE INVENTION

Liquid crystal per se cannot emit light. Therefore, in a liquid crystal display device, it is necessary to use a back light module to provide a light source having even and high brightness for a liquid crystal cell.

The back light module generally includes a light source, an optical film, a light guide plate and a back plate, for example. In particular, depending on distributed location of the light source in the back light module, the back light module can be classified into an edge-lit back light module and a direct-lit back light module, wherein the light source in the edge-lit back light module is located on a side of a display panel and usually suitable for a liquid crystal display device having relative small size; and the light source in the direct-lit back light module is located on a bottom of the display panel and usually suitable for a liquid crystal display device having relative large size. The light guide plate is an essential component in the back light module which can transform a point light source and/or linear light source into an area light source, to provide an area light source output having even brightness. The optical film is arranged on a light exiting surface of the light guide plate, to further process light output from the light guide plate, such that the light can be emitted evenly and perpendicularly to the light exiting surface of the light guide plate. The back plate is used to support and fix components such as the light source, the light guide plate and the optical film.

Usually, in order to position the light guide plate, a positioning slot is provided in a middle position of a non-light incident surface on the edge of the light guide plate, and a positioning pin is mounted in the positioning slot to position the light guide plate. In practice, since the light guide plate is fragile and has the thermal expansion and contraction characteristics. For this reason, it is necessary to leave an expansion gap (or an expansion size) in advance between the positioning slot and the positioning pin of the light guide plate and between the light guide plate and the light source. Also, machining errors in sizes of the positioning slot, the positioning pin and the light guide plate may further influence a gap between the light incident surface of the light guide plate and the light exiting surface of the light source. Therefore, it may be easy to cause that the gap between the light incident surface of the light guide plate and the light exiting surface of the light source has relatively large amplitude of variation. Not only may display images be uneven, but also the gap between the light guide plate and the light source may have significant differences for different display devices, such that the display quality is different according to the display devices.

SUMMARY OF THE INVENTION

To address one of technical problems in the prior art, the disclosure provides a back light module and a display device. The back light module may ensure that the gap between the light incident surface of light guide plate and the light source has a fixed value, thereby improving evenness of display images of display device. Therefore, the gap between the light incident surface of light guide plate and the light exiting surface of light source may not be considered to be a factor influencing quality of the display images of display device.

On one hand, there is provided a back light module in the disclosure, comprising a light source, a back plate, a light guide plate and a positioning member, in which the back plate is formed with a frame for receiving the light guide plate; the light source is provided on an inside surface of a side panel of the back plate and oppositely to a light incident surface of the light guide plate. The positioning member is provided at both ends of the back plate on a side where the light source is formed and the positioning member is interposed between the light incident surface of the light guide plate and the back plate.

Preferably, the positioning member is movably connected to the back plate, such that the positioning member is able to slide to a preset position.

Preferably, the light source is provided on the inside surface of a bottom side panel of the back plate; and the preset position is a position when the positioning member is brought into contact with a bottom surface of the back plate.

Optionally, the positioning member comprises a positioning portion, a connecting portion, a sliding block and a stop block, and a sliding slot is provided on a back side panel or side panel of the back plate, and wherein the positioning portion is fixedly connected to the connecting portion or formed integrally therewith, and the positioning portion is interposed between the light incident surface of the light guide plate and the light source; the connecting portion is in contact with the back side panel of the back plate; the sliding block is formed on the connecting portion and is able to slide within the sliding slot; and the stop block is provided on the sliding block to restrict the sliding block within the sliding slot.

Preferably, the sliding slot comprises a first portion and a second portion, the first portion being connected with the second portion and positioned above the second portion, wherein the second portion has a cross sectional area smaller than that of the first portion; the stop block has a cross sectional area smaller than that of the first portion and larger than that of the second portion, such that the stop block is able to pass through the first portion of the sliding slot but unable to pass through the second portion of the sliding slot; and the sliding block has a cross sectional area smaller than or equal to that of the second portion, such that the sliding block is able to slide within the sliding slot.

Particularly, an included angle more than 0° but less than or equal to 90° is formed between the sliding direction of the sliding block and the light incident surface of the light guide plate.

Preferably, the positioning portion further comprises a first auxiliary plate which extends upwards parallel to the light guide plate.

Preferably, the positioning member further comprises a second auxiliary plate which is perpendicular to the positioning portion and the connecting portion.

Preferably, an elastic member is provided between the non-light incident surface of the light guide plate and the back plate.

Optionally, the elastic member includes an air cushion, a spring and/or a resilient pad.

Preferably, when the positioning member is at the preset position, the stop block fixes the positioning member by tightening.

Optionally, the light source is provided on an inside surface of an upper panel, a right side panel and a left side panel of the back plate, and the back light module further comprises an elastic member which is interposed between a non-light incident surface of the light guide plate and the back plate.

On the other hand, there is also provided a display device in the disclosure. The display device includes a display panel and the aforesaid back light module.

The embodiments of the disclosure have following beneficial effects:

In the back light module according to the disclosure, the positioning member is provided at both ends of the back plate on a side where the light source is formed and the positioning member is interposed between the light incident surface of the light guide plate and the light source. In the case that the light source is provided on the inside surface of the bottom side panel of the back plate, then the light guide plate may be positioned over the positioning member under the action of its gravity. Since the position of the positioning member is fixed, the gap between the light incident surface of the light guide plate and the light exiting surface of the light source has a fixed value. Compared with the back light module in the prior art, the problem that a machining error of the positioning slot and the positioning pin influences the gap between the light incident surface of the light guide plate and the light exiting surface of the light source can be resolved, and in the meanwhile, the machining error in size of the light guide plate will not influence the gap between the light incident surface of the light guide plate and the light exiting surface of the light source. Therefore, it is possible to improve evenness of display images of the display device. Further, for different liquid crystal display devices, the gaps between the light incident surface of the light guide plate and the light exiting surface of the light source may have very small differences or even be the same. Therefore, the gap between the light incident surface of the light guide plate and the light exiting surface of the light source will not be considered to be a factor influencing quality of display images of the display device.

The display device according to the disclosure employs the back light module as stated above. Therefore, it is possible to improve evenness of display images of the display device, and in the meanwhile, the gap between the light incident surface of the light guide plate and the light source will not be considered to be a factor influencing quality of display images of the display device.

Figure 1:
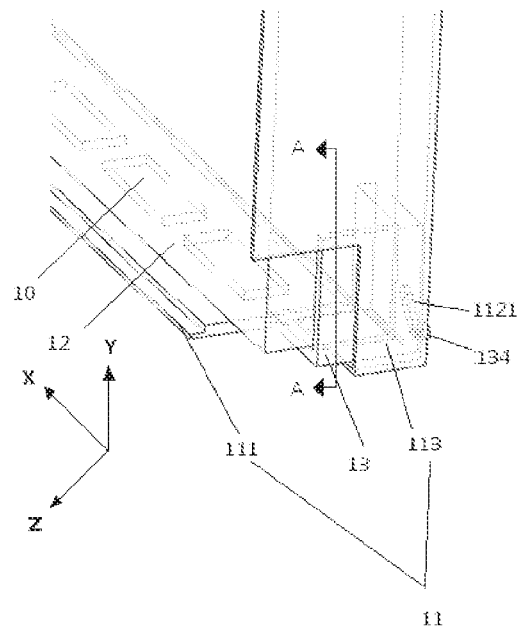
FIG. 1 is a partial perspective view of a back light module according to the disclosure.

In reference numeral list: 10, light source; 11, back plate; 111, bottom side panel of back plate; 112, back side panel of back plate; 113, right side panel of back plate; 1121, sliding slot; 1121a, first portion of sliding slot; 1121b, second portion of sliding slot; 12, light guide plate; 13, positioning member; 131, positioning portion; 132, connecting portion; 133, sliding block; 134, stop block; 135, first auxiliary plate; 136, second auxiliary plate; A, included angle between a sliding direction of the sliding block and a side where the light source is located.

DETAILED DESCRIPTION OF THE EMBODIMENTS

In order to better understand the technical solutions of the disclosure by those skilled in the art, hereinafter the back light module and the display device according to the disclosure will be described in detail in conjunction with the accompanying drawings.

Herein, for the purpose of simple description of the disclosure, orientations or spatial relations indicated by terms "upper", "lower", "left", "right", "front", "back" and "bottom", for example, are all based on the orientations or spatial relations in FIG. 1. Particularly, in FIG. 1, X-axial direction refers to a left side direction, −X-axial direction refers to a right side direction, Y-axial direction refers to an upper direction, −Y-axial direction refers to a lower direction, Z-axial direction refers to a back direction, and −Z-axial direction refers to a front direction. In addition, hereinafter "the gap between the light incident surface of the light guide plate and the light exiting surface of the light source" indicates a distance between the light incident surface of the light guide plate and the light exiting surface of the light source in Y axis.

Figure 2:
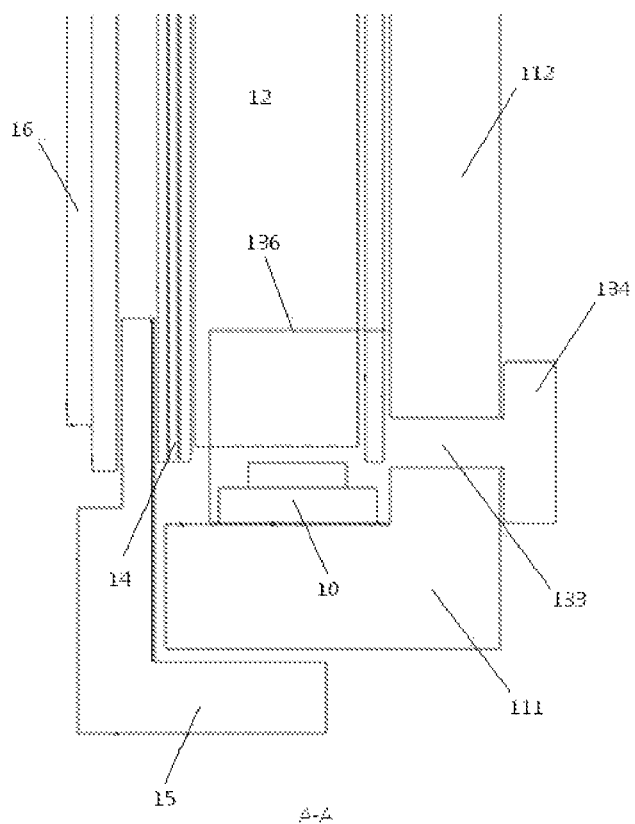
FIG. 2 is a sectional view taken along a line A-A in FIG. 1.

FIG. 1 is a partial (right side) perspective view of a back light module according to the disclosure; and FIG. 2 is a sectional view taken along a line A-A in FIG. 1. With reference to FIG. 1 and FIG. 2, the back light module according to the disclosure may comprise a light source 10, a back plate 11, a light guide plate 12 and a positioning member 13. Herein, the back plate 11 is formed with a frame for receiving the light guide plate 12; the light source 10 is provided on an inside surface of a bottom side panel 111 of the back plate 11 and oppositely to a light incident surface of the light guide plate 12. In other words, the light source 10 is provided on an inner surface of the back plate 11 and arranged upwards. The light guide plate 12 is mounted in the frame formed by the back plate 11 such that the light incident surface of the light guide plate 12 is arranged oppositely to the light source 10.

The positioning member 13 is provided at both ends of the back plate 11 on a side where the light source 10 is formed and the positioning member is interposed between the light incident surface of the light guide plate 12 and the back plate 11.

From the above, when the back light module according to the embodiment of the disclosure is used, the light guide plate 12 could be brought into contact with the positioning member 13 under the action of its gravity. Since the position of the positioning member 13 is fixed, the gap between the light incident surface of the light guide plate 12 and the light exiting surface of the light source 10 has a fixed value. Compared with the back light module in the prior art, the problem that a machining error of the positioning slot and the positioning pin influences the gap between the light incident surface of the light guide plate 12 and the light exiting surface of the light source 10 can be resolved, and in the meanwhile, the machining error in size of the light guide plate will not influence the gap between the light incident surface of the light guide plate 12 and the light exiting surface of the light source 10. Therefore, it is possible to improve evenness of display images of the display device. Further, for different liquid crystal display devices, the gaps between the light incident surface of the light guide plate 12 and the light exiting surface of the light source 10 may have very small differences or even be the same. Therefore, the gap between the light incident surface of the light guide plate 12 and the light exiting surface of the light source 10 will not be considered to be a factor influencing quality of display images of the display device.

Preferably, in this embodiment, the positioning member 13 is movably contacted with the back plate 11, such that the positioning member 13 may slide down to a preset position. Further, the preset position is a position when the positioning member 13 is brought into contact with a bottom surface of the back plate. In this case, the gap between the light incident surface of the light guide plate and the light exiting surface of the light source 10 is only dependent on thickness of the positioning member 13.

Figure 3:
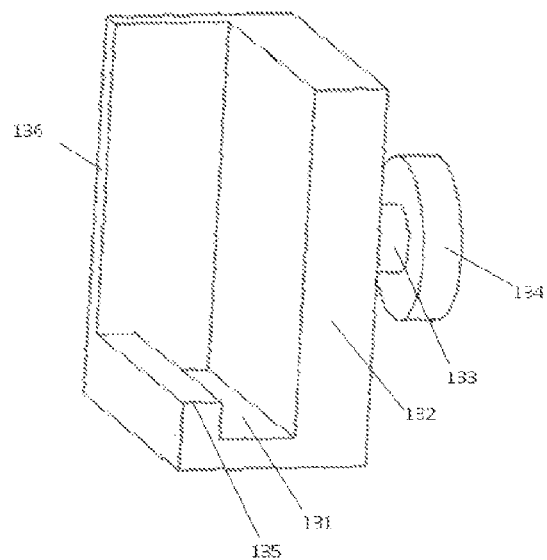
FIG. 3 is a schematic diagram illustrating a first example of a structure of a positioning member.

Hereinafter, the movable contact of the positioning member 13 with the back plate 11 will be described in detail with reference to FIG. 3 and FIG. 4. In particular, as shown in FIG. 3, the positioning member 13 may comprise a positioning portion 131, a connecting portion 132, a sliding block 133 and a stop block 134. A sliding slot 1121 is provided on a back side panel 112 or side panel of the back plate 11. The positioning portion 131 is fixedly connected to the connecting portion 132 or formed integrally therewith, and the positioning portion 131 is interposed between the light incident surface of the light guide plate 12 and the light source 10; the connecting portion 132 is in contact with the back side panel 112 of the back plate 11; the sliding block 133 is formed on the connecting portion 132 and can slide within the sliding slot 1121 on back side panel 112 or side panel of the back plate 11; and the stop block 134 is provided on the sliding block 133 to restrict the sliding block 133 within the sliding slot 1121. In addition, preferably, when the positioning member 13 is located at the preset position, the stop block 134 may fix the positioning member 13, for example, by tightening.

Figure 4:
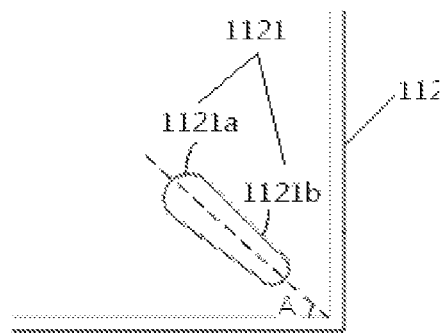
FIG. 4 is a schematic diagram illustrating a first example of a structure of a sliding slot on a back side panel of a back plate.

In particular, as shown in FIG. 4, the sliding slot 1121 may comprise a first portion 1121a and a second portion 1121b, the first portion 1121a being connected with the second portion 1121b and positioned above the second portion 1121b. The second portion 1121b has a cross sectional area smaller than that of the first portion 1121a. The stop block 134 has a cross sectional area smaller than that of the first portion 1121a and larger than that of the second portion 1121b, such that the stop block 134 can pass through the first portion 1121a of the sliding slot 1121 but cannot pass through the second portion 1121b of the sliding slot 1121. The sliding block 133 has a cross sectional area smaller than or equal to that of the second portion 1121b, such that the sliding block 133 may slide within the sliding slot 1121, until it is brought into contact with the bottom side panel 111 of the back plate 11.

Herein, an included angle A more than 0° but less than or equal to 90° is formed between the sliding direction of the sliding block 133 (the direction of the dashed line in FIG. 4) and the light incident surface of the light guide plate 12 (the X-Y plane in this embodiment), such that the sliding block 133 can slide from top through to the preset position.

As shown in FIG. 4, the sliding slot 1121 has a tapered outline. However, the disclosure is not limited thereto. In practice, the sliding slot 1121 may also have a T-shaped outline (as shown in FIG. 5), or may have any other suitable shapes.

Figure 5:
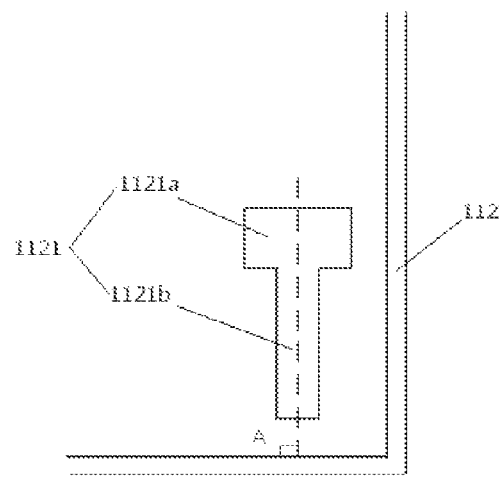
FIG. 5 is a schematic diagram illustrating a second example of a structure of the sliding slot on the back side panel of the back plate.
Figure 6:
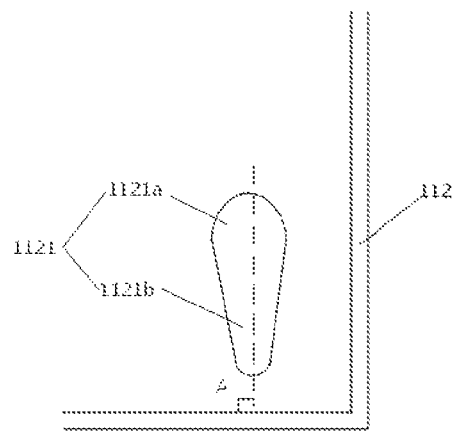
FIG. 6 is a schematic diagram illustrating a third example of a structure of the sliding slot on the back side panel of the back plate.

Preferably, as shown in FIG. 5 and FIG. 6, an included angle A equal to 90° is formed between the sliding direction of the sliding block 133 (the dashed line in FIG. 5 and FIG. 6) and the X-Y plane. In other words, the sliding direction of the sliding block 133 is perpendicular to the X-Y plane. This may facilitate sliding of the sliding block 133 within the second portion 1121b.

In addition, preferably, as shown in FIG. 3, the positioning member 13 may include a first auxiliary plate 135 which extends upwards parallel to the light guide plate 12 so as to restrict the light guide plate 12 in the Z-axial direction. Since the light guide plate 12 is restricted in the Z-axial direction, an alignment error between a light emitting surface of the light source 10 and the light incident surface of the light guide plate 12 in the Z-axial direction can be reduced to avoid light leakage.

More preferably, the positioning member 13 may further include a second auxiliary plate 136 which is perpendicular to the positioning portion 131 and the connecting portion 132. Particular, in this embodiment, when a pair of positioning members 13 is provided on both sides of the light guide plate 12, it is possible to restrict the light guide plate 12 in the X-axial direction.

In addition, preferably, an elastic member (not shown) may be provided between the non-light incident surface of the light guide plate 12 and the back plate 11. The elastic member can not only further fix the light guide plate 12 but also absorb expansion of the light guide plate 12 due to being heated. For example, the elastic member could be a resilient pad, a spring and/or an air cushion.

It should be explained that, in this embodiment, although the preset position of the positioning member 13 is preferably the position when the positioning member 13 slides down to the bottom side panel 111 of the back plate 11, the disclosure is not limited thereto. In practice, the preset position can also be determined according to the gap between the light incident surface of the light guide plate 12 and the light exiting surface of the light source 10 and the thickness of the positioning member 13 as necessary. Herein, the thickness of the positioning member 13 refers to a perpendicular distance (i.e., a distance in the Z-axial direction) between an upper surface and a lower surface of the positioning member 13.

Also, it should be explained that, in this embodiment, although the sliding slot 1121 is provided on the back side panel 112 of the back plate 11, the disclosure is not limited thereto. In practice, the sliding slot 1121 may also be provided on the side panel of the back plate 11.

Figure 7:
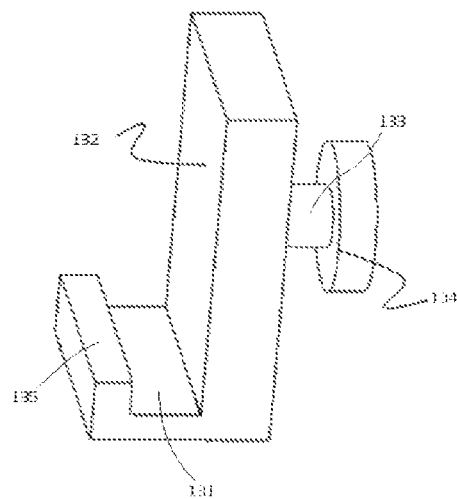
FIG. 7 is a schematic diagram illustrating a second example of a structure of the positioning member.
Figure 8:
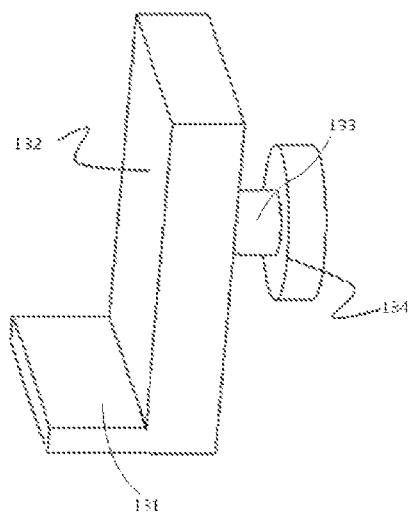
FIG. 8 is a schematic diagram illustrating a third example of a structure of the positioning member.

Also, it should be explained that, in practice, the positioning member 13 may employ any other suitable structure. For example, as shown in FIG. 7, the positioning member 13 may not be provided with the second auxiliary plate 136. As another example, as shown in FIG. 8, the positioning member 13 may not be provided with the first auxiliary plate 135 and the second auxiliary plate 136.

In addition, although, in the embodiment of the disclosure, the positioning member 13 slides to the preset position, the disclosure is not limited thereto. In practice, the positioning member 13 can be disposed at the preset position in any suitable manners.

In addition, the aforesaid embodiments are described by way of example in which the light source 10 is disposed on the bottom side panel 111 of the back plate 11. In practice, the light source 10 may also be provided on other positions (for example, an inside surface of an upper panel, a right side panel and a left side panel) of the back plate 11. In this case, the back light module may preferably comprise an elastic member which is interposed between a non-light incident surface of the light guide plate 12 and the back plate 11. The elastic member may apply a resilient force to the light guide plate 12 to engage it with the positioning member 13. In such a manner, it may also be possible to ensure that the gap between the light incident surface of the light guide plate and the light exiting surface of the light source have a fixed value. Compared with the back light module in the prior art, the problem that a machining error of the positioning slot and the positioning pin influences the gap between the light incident surface of the light guide plate and the light exiting surface of the light source can be resolved, and in the meanwhile, the machining error in size of the light guide plate will not influence the gap between the light incident surface of the light guide plate and the light exiting surface of the light source. Therefore, it is possible to improve evenness of display images of the display device. Further, for different liquid crystal display devices, the gaps between the light incident surface of the light guide plate and the light exiting surface of the light source may have very small differences or even be the same. Therefore, the gap between the light incident surface of the light guide plate and the light exiting surface of the light source will not be considered to be a factor influencing quality of display images of the display device. In this case, similarly to the aforesaid embodiments, the elastic member can not only further fix the light guide plate 12 but also absorb expansion of the light guide plate 12 due to being heated.

Of course, in this case, the structure and arrangement of the positioning member 13 may be similar to that of the aforesaid embodiments. For example, the positioning member 13 may be movably connected to the back plate 11, such that the positioning member 13 can slide to the preset position.

As another technical solution, the disclosure also provides a display device including a back light module and a display panel, wherein the back light module employs the back light module according to the aforesaid embodiments.

Since the display device according to the disclosure employs the aforesaid back light module, it is possible to improve evenness of display images of the display device, and in the meanwhile, the gap between the light incident surface of the light guide plate and the light source will not be considered to be a factor influencing quality of display images of the display device.

It should be understood that the above implementations are merely exemplary embodiments for the purpose of illustrating the principle of the disclosure, and the disclosure is not limited thereto. Various modifications and improvements can be made by a person having ordinary skill in the art without departing from the spirit and the essence of the disclosure. Accordingly, all of the modifications and improvements also fall into the protection scope of the disclosure.

The invention claimed is:

1. A back light module, comprising a light source, a back plate, a light guide plate and a positioning member, in which the back plate is formed with a frame for receiving the light guide plate; the light source is provided on an inside surface of a side panel of the back plate and oppositely to a light incident surface of the light guide plate, wherein
    the positioning member is provided at both ends of the back plate on a side where the light source is formed and the positioning member is interposed between the light incident surface of the light guide plate and the light source,
    the positioning member is movably connected to the back plate, such that the positioning member is able to slide to a preset position,
    the positioning member comprises a positioning portion, a connecting portion, a sliding block and a stop block, and a sliding slot is provided on a back side panel or side panel of the back plate, and wherein
    the positioning portion is fixedly connected to the connecting portion or formed integrally therewith, and the positioning portion is interposed between the light incident surface of the light guide plate and the light source;
    the connecting portion is in contact with the back side panel of the back plate;
    the sliding block is formed on the connecting portion and is able to slide within the sliding slot; and
    the stop block is provided on the sliding block to restrict the sliding block within the sliding slot.

2. The back light module according to claim 1, wherein
    the light source is provided on the inside surface of a bottom side panel of the back plate; and
    the preset position is a position when the positioning member is brought into contact with a bottom surface of the back plate.

3. The back light module according to claim 2, wherein
    an elastic member is provided between the non-light incident surface of the light guide plate and the back plate.

4. The back light module according to claim 3, wherein
    the elastic member includes an air cushion, a spring and/or a resilient pad.

5. The back light module according to claim 1, wherein
    the sliding slot comprises a first portion and a second portion, the first portion being connected with the second portion and positioned above the second portion, and wherein
    the second portion has a cross sectional area smaller than that of the first portion;
    the stop block has a cross sectional area smaller than that of the first portion and larger than that of the second portion, such that the stop block is able to pass through the first portion of the sliding slot but unable to pass through the second portion of the sliding slot; and
    the sliding block has a cross sectional area smaller than or equal to that of the second portion, such that the sliding block is able to slide within the sliding slot.

6. The back light module according to claim 1, wherein an included angle more than 0° but less than or equal to 90° is formed between the sliding direction of the sliding block and the light incident surface of the light guide plate.

7. The back light module according to claim 1, wherein the positioning portion further comprises a first auxiliary plate which extends upwards parallel to the light guide plate.

8. The back light module according to claim 1, wherein the positioning member further comprises a second auxiliary plate which is perpendicular to the positioning portion and the connecting portion.

9. The back light module according to claim 1, wherein when the positioning member is located at the preset position, the stop block fixes the positioning member by tightening.

10. The back light module according to claim 1, wherein the light source is provided on an inside surface of an upper panel, a right side panel and a left side panel of the back plate, and the back light module further comprises an elastic member which is interposed between a non-light incident surface of the light guide plate and the back plate.

11. A display device, including a back light module and a display panel, wherein the back light module employs the back light module according to claim 1.

12. The display device according to claim 11, wherein the light source is provided on the inside surface of a bottom side panel of the back plate; and the preset position is a position when the positioning member is brought into contact with a bottom surface of the back plate.

13. The display device according to claim 11, wherein the sliding slot comprises a first portion and a second portion, the first portion being connected with the second portion and positioned above the second portion, and wherein the second portion has a cross sectional area smaller than that of the first portion;

the stop block has a cross sectional area smaller than that of the first portion and larger than that of the second portion, such that the stop block is able to pass through the first portion of the sliding slot but unable to pass through the second portion of the sliding slot; and the sliding block has a cross sectional area smaller than or equal to that of the second portion, such that the sliding block is able to slide within the sliding slot.

14. The display device according to claim 11, wherein an included angle more than 0° but less than or equal to 90° is formed between the sliding direction of the sliding block and the light incident surface of the light guide plate.

15. The display device according to claim 11, wherein the positioning portion further comprises a first auxiliary plate which extends upwards parallel to the light guide plate.

16. The display device according to claim 11, wherein the positioning member further comprises a second auxiliary plate which is perpendicular to the positioning portion and the connecting portion.

* * * * *